United States Patent
Dietzel et al.

(10) Patent No.: US 8,590,850 B2
(45) Date of Patent: Nov. 26, 2013

(54) SCREEN ADJUSTMENT DEVICE FOR A MOTOR VEHICLE

(75) Inventors: Renee Dietzel, Sonnefeld (DE); Daniela Stegner, Coburg (DE)

(73) Assignee: Brose Fahzeugteile GmbH & Co., Kommanditgesellschaft, Coburg, Coburg (DE)

( * ) Notice: Subject to any disclaimer, the term of this patent is extended or adjusted under 35 U.S.C. 154(b) by 210 days.

(21) Appl. No.: 13/125,336

(22) PCT Filed: Oct. 7, 2009

(86) PCT No.: PCT/EP2009/007180
§ 371 (c)(1),
(2), (4) Date: Jun. 17, 2011

(87) PCT Pub. No.: WO2010/049055
PCT Pub. Date: May 6, 2010

(65) Prior Publication Data
US 2011/0247770 A1    Oct. 13, 2011

(30) Foreign Application Priority Data
Oct. 29, 2008    (DE) .......................... 10 2008 053 734

(51) Int. Cl.
*E04G 3/00*    (2006.01)

(52) U.S. Cl.
USPC ...................... 248/286.1; 248/298.1; 248/923

(58) Field of Classification Search
USPC ......... 248/286.1, 295.11, 298.1, 292.14, 917, 248/919–923, 125.1, 125.2, 121, 122.1, 248/274.1, 276.1; 312/319.5, 319.6, 319.7, 312/319.8; 348/836, 837, 838, 839
See application file for complete search history.

(56) References Cited

U.S. PATENT DOCUMENTS 6,416,027 B1 *   7/2002   Hart .............................. 248/324
6,476,879 B1 *  11/2002   Ho et al. ....................... 348/837

(Continued)

FOREIGN PATENT DOCUMENTS

CN    101099022 A    1/2008
DE    4128663 A1    12/1992

(Continued)

OTHER PUBLICATIONS

International Search Report for PCT/EP2009/007180, Mailing Date: Jun. 7, 2010 (8 pages).

(Continued)

*Primary Examiner* — Steven Marsh
(74) *Attorney, Agent, or Firm* — Mendelsohn, Drucker & Dunleavy, P.C.; Steve Mendelsohn (57) ABSTRACT

A screen adjustment device (1) for a motor vehicle has a screen (6) or screen carrier (2) for mounting a screen, and a control cable drive (4) for adjusting the screen or screen carrier between an open (screen-accessible) position (22) and a parked (screen-hidden) position (24). The control cable drive has a control cable (11), which is coupled to the screen or screen carrier by a driver (15) and which at the two ends is guided over two return elements (12, 13) and at least one cable tensioning unit (18, 19) onto a winding reel (14) coupled to a drive motor (21). The control cable drive has a bearing block (30) for supporting the winding reel, the block together with the cable tensioning unit forming a self-contained pre-assembled unit (20) or being capable of pre-assembly to form such a unit.

12 Claims, 9 Drawing Sheets

(56) References Cited

U.S. PATENT DOCUMENTS

| | | | |
|---|---|---|---|
| 7,055,790 B2 * | 6/2006 | Schroeter | 248/323 |
| 7,441,738 B2 * | 10/2008 | Kim | 248/292.12 |
| 8,186,637 B2 * | 5/2012 | Walters et al. | 248/279.1 |
| 2009/0109352 A1 * | 4/2009 | Lewis et al. | 348/837 |

FOREIGN PATENT DOCUMENTS

| | | |
|---|---|---|
| DE | 9409709 U1 | 9/1994 |
| DE | 19938690 A1 | 2/2001 |
| DE | 10008887 A1 | 10/2001 |
| DE | 10042495 A1 | 3/2002 |
| DE | 202004000292 U1 | 4/2004 |
| DE | 102004008791 B3 | 9/2005 |
| DE | 102005012010 A1 | 9/2006 |
| DE | 102005038485 A1 | 2/2007 |
| DE | 102005052030 A1 | 5/2007 |
| EP | 1911628 A1 | 4/2008 |
| WO | WO 99/65734 A1 | 12/1999 |

OTHER PUBLICATIONS

German Search Report dated May 4, 2009 (4 pages).
Chinese Office Action; Mailed Dec. 24, 2012 for corresponding CN Application No. 200980141281.

* cited by examiner

SCREEN ADJUSTMENT DEVICE FOR A MOTOR VEHICLE

BACKGROUND

1. Field of the Invention

The invention relates to a screen adjustment device for a motor vehicle.

2. Description of the Related Art

In modern motor vehicles a screen, which serves as output interface of an on-board computer for displaying various ambient and operating variables, such as the outdoor temperature, the fuel consumption etc., is often provided in the area of the dashboard. In addition or alternatively, such a screen often also serves as an output unit of a navigation system, car radio, etc. If a touch-sensitive screen is used or separate operating elements are assigned to a display which in itself is non-touch-sensitive, such a screen may also be provided as an input interface for the on-board computer, the navigation system or the car radio.

Screens are furthermore also used in the rear area of the vehicle passenger compartment of a motor vehicle. Here these screens primarily form part of a multimedia entertainment system (rear seat entertainment).

For reasons of space, for protection against damage and dirt and not least also as an anti-theft measure, such screens are often adjustable in such a way that they are accessible (and thereby also visible) from the vehicle passenger compartment only when they are actually needed. Otherwise such screens can be run into a rest or parked position hidden from the vehicle passenger compartment.

Since the overall space available in a motor vehicle for accommodating the screen in the parked position is generally severely restricted, motor vehicle screens often have to be moved over a complex adjustment travel between the open position and the parked position. In the parked position the screen is often accommodated in a substantially horizontal position inside the dashboard. To move it into the open position, the screen is generally first pushed in a substantially horizontal direction out of the dashboard and is then or at the same time tilted into an inclined upright orientation, in which the screen is fully visible for a vehicle occupant. For performing this movement, the screen is often guided by a sliding guide and/or a more or less complex lever system. Here the screen is often adjusted by a toothed rack drive. Screen adjustment devices of the type described above are disclosed in particular by DE 10 2005 012 010 A1, DE 10 2005 052 030 A1 and DE 199 38 690 A1.

The complexity of such screen adjustment devices and the limited scope for installing such a device in a motor vehicle often make it difficult and time-consuming to fit the device in a motor vehicle.

The object of the invention is to specify an improved screen adjustment device, that is to say, in particular, one that can be fitted easily and efficiently.

SUMMARY

According to certain embodiments of the invention this object is achieved by the features of claim 1. The screen adjustment device accordingly comprises a screen or at least a screen carrier for mounting this, and a control cable drive, which serves for adjusting the screen or screen carrier between an open position and a parked position. In the open position the screen is in this case accessible (in particular visible) from a vehicle passenger compartment. In the parked position, on the other hand, the screen is hidden from the vehicle passenger compartment. The control cable drive comprises a control cable, which is (indirectly or directly) coupled to the screen or the screen carrier by a driver. At the two ends this control cable is guided (at least in terms of its drive) over two return elements on to a winding reel coupled to a drive motor. At the same time the control cable is also guided over at least one cable tensioning unit.

Here the terms "cable" and "control cable" are used synonymously for a flexible tensile element of any design. For the purposes of the invention, therefore, cables or control cables are, in particular, stranded pull cords, belts, bands or chains of any material and of any cross section, and besides steel cables and plastic belts thus also include, V-belts or link chains, for example.

According to certain embodiments of the invention the control cable drive comprises a bearing block for supporting the winding reel, said block together with the cable tensioning unit forming a self-contained, pre-assembled unit or being capable of pre-assembly to form such a unit. The pre-assembled unit formed from at least the bearing block and the cable tensioning unit is termed "self-contained" in as much as these parts, regardless of the vehicle components surrounding them in the installed state, are fixed together (in the pre-assembly state) or can be fixed together (in any existing unfinished state). The pre-assembled unit can therefore be assembled independently of the motor vehicle and inserted in its entirety into the motor vehicle.

The invention in certain embodiments is based on the consideration that, instead of a toothed rack drive, for a screen adjustment device of the aforementioned type it is advantageously possible to use a control cable drive, especially since the latter lends itself to particularly flexible and straightforward adaptation to restricted overall spaces and complex movement paths. One disadvantage to a conventional control cable drive, however, is the known fact that this usually comprises a large number of isolated small parts, such as return sheaves, tensioning rollers, etc., which in turn would complicate the process of assembling the control cable drive in the motor vehicle. This forms the point of departure for certain embodiments of the invention. Since according to certain embodiments of the invention at least the core of the control cable drive, that is to say the bearing block for or with the winding reel, and the cable tensioning unit are or can be pre-assembled, the production process can be substantially simplified. The simplification lies, in particular, in the fact that assembly of the control cable drive, comprising small parts which are therefore difficult to assemble, in this respect does not have to be undertaken under the restricted spatial conditions in the motor vehicle, but can be done separately from this in an unconfined area. In particular, the scope for at least partial pre-assembly of the control cable drive furthermore allows this to be prefabricated, particularly by a supplier, at a separate location to that of final assembly of the motor vehicle.

In the interests of an especially simple pre-assembly, a housing of the cable tensioning unit is preferably produced, at least in part, integrally with the bearing block for the winding reel.

In a suitable embodiment the cable tensioning unit comprises a fixed return element and a further return element, which is elastically deflectable against pre-tensioning in relation to the fixed return element, in order to produce a balanced length adjustment of the control cable. Here the deflectable return element is in particular guided linearly or curvilinearly on a housing of the cable tensioning unit.

At least the fixed return element is suitably integrally formed with the bearing block. In a simple configuration the return elements of the cable tensioning unit are preferably formed by spindles, which are held rotationally fixed on the housing of the tensioning unit. Alternatively, however, the return elements may also be formed by rollers. In the latter case the roller corresponding to the fixed return element is suitably supported on a spindle integrally formed with the bearing block.

The deflectable return element preferably comprises a spindle, which is displaceably guided in a slotted hole guide. The slotted hole guide is formed, in particular, by two slotted holes introduced so that they align with one another in opposite walls of the housing. In order, on the one hand, to facilitate manufacture and assembly of the tensioning unit, but on the other to ensure a secure support of the spindle of the deflectable return element in the slotted hole guide and a non-tilting guide for this spindle, in an advantageous embodiment this spindle is provided with at least one radial projection, which interacts with the slotted hole guide in the manner of a bayonet lock. This radial projection is therefore attached to the spindle of the deflectable return element in such a way that with the spindle in the assembled state it grips positively behind the slotted hole guide, but the spindle, when in a state rotated in relation to the assembled state, can be fed through the slotted hole guide. Instead of a single radial projection the spindle is preferably provided with two diametrically opposing radial projections—particularly two at each end.

Instead of a slotted hole guide, a rail guide or a lever arm pivotally mounted on the housing of the cable tensioning unit may also be provided for guiding the deflectable return element.

To facilitate assembly of the control cable drive, particularly in order to allow the control cable to be easily threaded into the cable tensioning unit, the housing of said unit preferably comprises a housing shell open on at least one side, which is integrally formed on to the bearing block, and a housing cover, which can be fitted or latched onto this housing shell. This housing cover is here suitably arranged perpendicularly to the spindle of the return elements of the tensioning unit.

In order to achieve an effective, balanced length adjustment of the control cable in both tensile directions of the control cable drive, that is to say both when closing the screen and when opening the screen, the control cable is preferably guided over a cable tensioning unit at each of the two ends on to the winding reel. Two cable tensioning units are therefore provided, one of which units is arranged directly preceding the winding reel in each of the two tensile directions. Here both cable tensioning units are designed in the manner described above, that is to say, in particular, they are or can be pre-assembled with the bearing block.

In order to further enhance the degree of prefabrication of the screen adjustment device, the bearing block together with the or each cable tensioning unit pre-assembled thereon can be latched on to a motor carrier for mounting of the motor.

In an advantageous further development of certain embodiments of the invention the winding reel is provided with a diameter varying over its axial extent. This exploits the finding that by varying the diameter of the winding reel it is possible specifically to vary the transmission ratio of the control cable drive, and thereby the control cable speed at a constant motor speed. Crucial to the transmission ratio of the winding reel here is the diameter of the winding reel at the cable separation, that is to say at the point on the winding reel where the control cable detaches itself from the winding reel in a given control cable position. Here the winding reel is preferably designed in such a way that in that axial area which, according to the cable separation, corresponds to a range of the screen adjustment travel close to the open position, it has a smaller diameter than in an axial area which, again according to the cable separation, corresponds to a middle position of the screen along its displacement travel between the open position and the parked position. As a result, at a constant motor speed the screen moves particularly slowly in a range of its adjustment travel close to the open position. This serves, in particular, to ensure a harmonious adjustment characteristic. Moreover, the increased transmission ratio in this range also keeps the load on the motor comparatively low. This is important particularly in view of the fact that in the area of the open position of the screen the control cable drive generally has to apply an especially high tensile force in order to adjust the screen, owing to the unfavorable leverage ratios.

A winding reel of varying diameter can advantageously be provided both in the device described above and also in a screen adjustment device of otherwise different design having a control cable drive. In this respect this feature is also regarded as an invention in its own right.

BRIEF DESCRIPTION OF THE DRAWINGS

An exemplary embodiment of the invention will be explained in more detail below with reference to a drawing, in which.

Corresponding parts are always provided with the same reference numerals in all figures.

DETAILED DESCRIPTION

The (screen adjustment) device 1 shown only in rough schematic form in FIGS. 1 to 5 is substantially formed by a screen carrier 2, a guide path 3 and a control cable drive 4.

Fixed to a front side 5 of the screen carrier 2 is a screen 6. At the rear a (plate or lever-type) guide contour 7, which engages positively with a catch 8 in the guide path 3, is fitted to the screen carrier 2. Here the screen carrier 3 can on the one hand be displaced with this catch 8 along the guide path 3. On the other hand the screen carrier 2 can be swiveled about the catch 8.

The guide path 3 extends substantially horizontally inside a dashboard 9 (indicated only roughly) of a motor vehicle above a mount 10 provided therein for the screen carrier 2 and the screen 6 affixed to the latter.

The control cable drive 4 comprises a control cable 11, which is guided over two main return points 12, 13 on to a winding reel 14.

The main return elements 12,13 are rotationally fixed spindles or rotatable supported rollers, over which the control cable 11 runs, and which in each case deflect the control cable 11 by approximately 180°.

The winding reel 14 forms both the start and the end of the control cable 11, in that during rotation of the winding reel 14 one end of the control cable 11 is wound up on the winding reel 14, and the other end of the control cable 11 is simultaneously wound off from the winding reel 14. An open control cable 11 is preferably used, having two actual ends which are each fixed to the winding reel 14. In the context of the invention, however, it is also possible to use an annularly closed control cable 11, which is wound once or multiple times around the winding reel 14. In this case the winding reel 14 only forms the start and end of the control cable 11 for drive purposes, the force always being introduced into the control cable 11 via the winding reel 14.

Fixed to the control cable 11 in the middle area thereof remote from the winding reel 14 and between the main return elements 12 and 13 is a driver 15, which is pivotally coupled via a driver arm 16 to a lower edge 17 of the screen 6. In an area between each of the main return elements 12 and 13 and the winding reel 14 the control cable 11 is on the one hand guided over a cable tensioning unit 18 and 19 respectively. The winding reel 14 is integrated with the cable tensioning units 18, 19 in a pre-assembled unit 20, described in more detail below. The control cable drive 4 further comprises a (drive) motor 21, particularly one in the form of an electric motor, which is drive connected to the winding reel 14, possibly via a transmission mechanism not further represented.

In the representation according to FIGS. 1 to 5 the driver 15, for example, is displaceable along a horizontal straight line about the mount 10 between the main return elements 12, 13. The main return elements 12, 13 here each form a stop for the driver 15 and therefore define its displacement travel. In a departure from the rectilinear guiding of the control cable 11 between the main return elements 12, 13, however, the control cable 11 and with it the driver 15 may also be guided in any curvilinear spatial curves.

Figure 1:
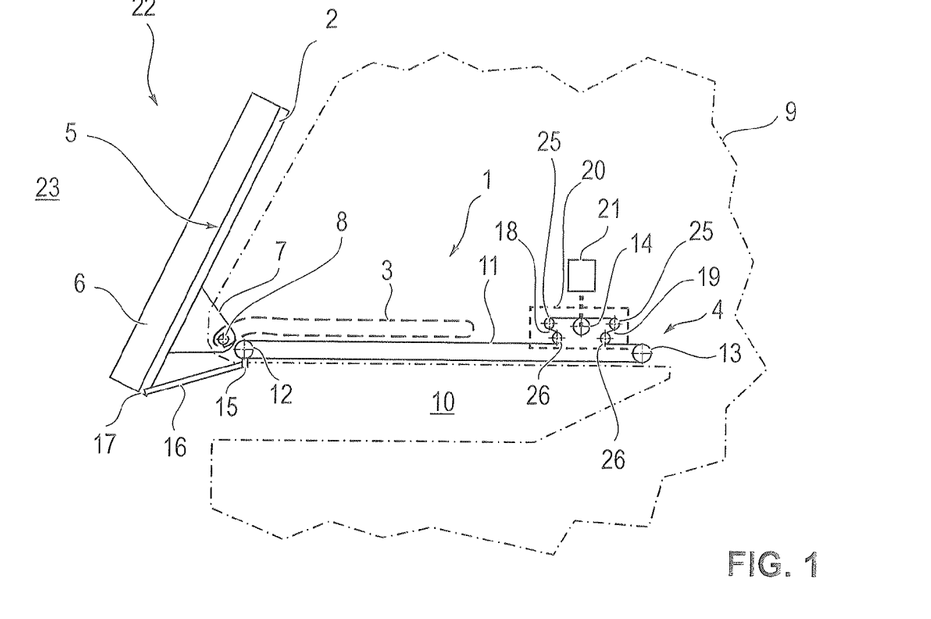
FIGS. 1 to 5 show a screen adjustment device having a screen carrier holding a screen, a sliding guide for the screen carrier, and a control cable drive coupled to the screen carrier in successive positions over a screen adjustment travel between an open position (FIG. 1) and a parked position (FIG. 5)
Figure 2:
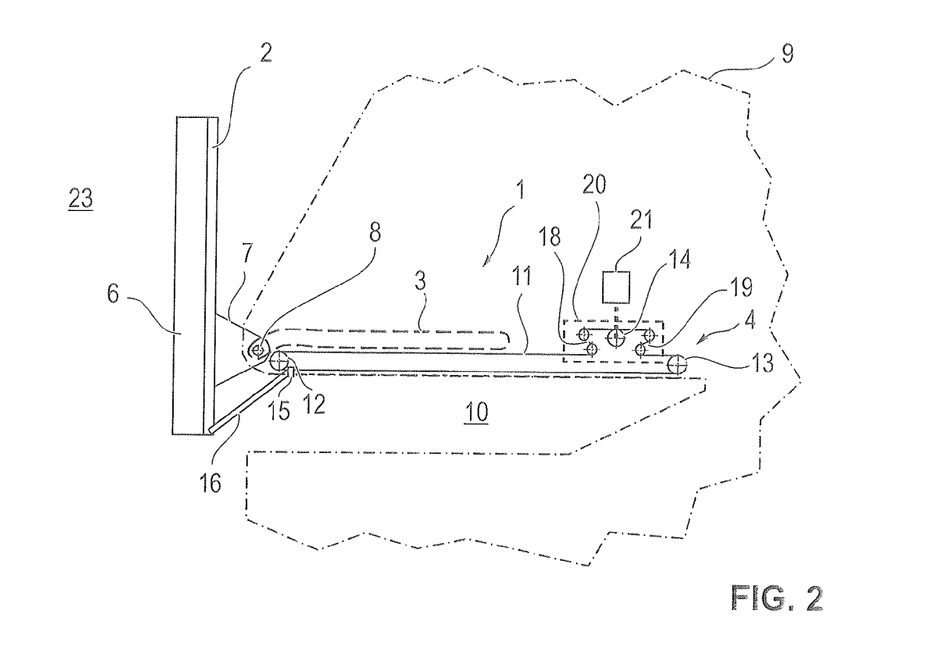
Figure 3:
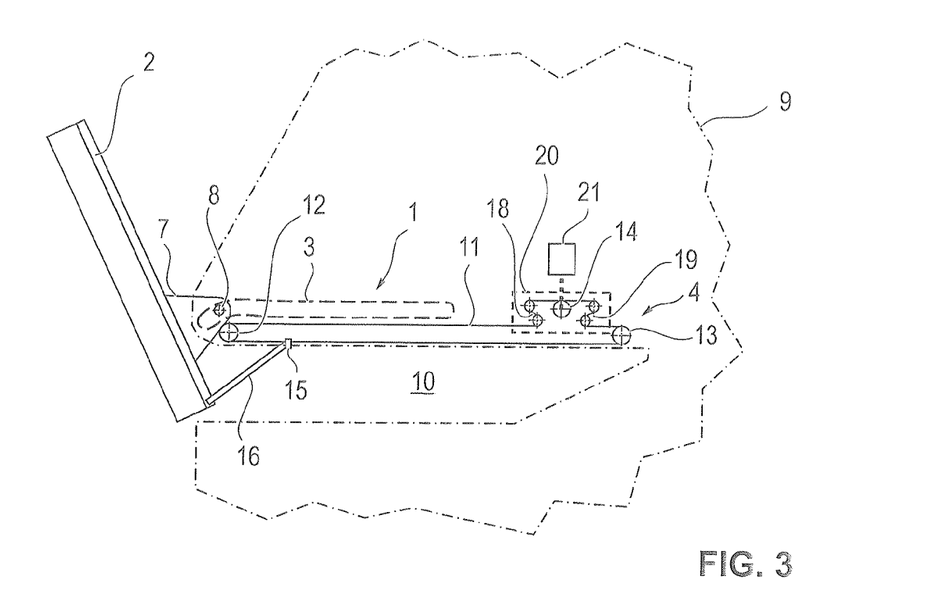
Figure 4:
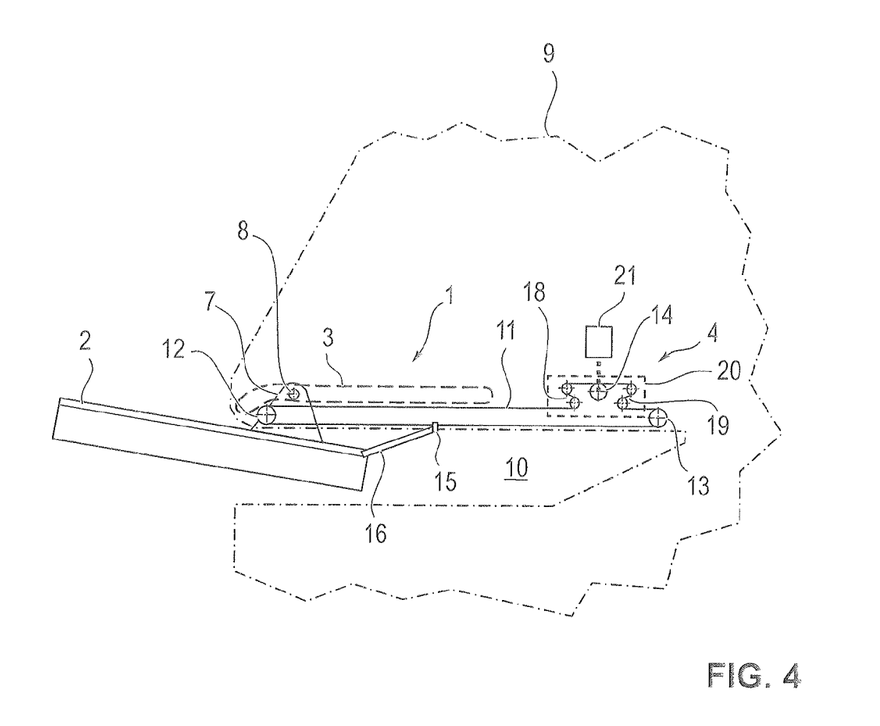

In the representation according to FIG. 1 the driver 15 strikes against the front main return element 12. This position of the control cable 11 corresponds to an open position 22 of the screen carrier 2, in which the screen carrier 2 is located in front of the dashboard 9 in an adjoining vehicle passenger compartment 23. Here the screen carrier 2 is slightly tilted in relation to the vertical, so that its front side 5, and with this the screen 6 affixed thereto, is oriented obliquely upwards in the vehicle passenger compartment 23, and is therefore readily accessible (and hence easily visible) to the vehicle occupants. In the open position 22 of the screen carrier 2 the catch of the guide contour 7 is situated against the front stop of the guide path 3. The term "front" here denotes the side of the dashboard 9 facing the vehicle occupants.

Figure 5:
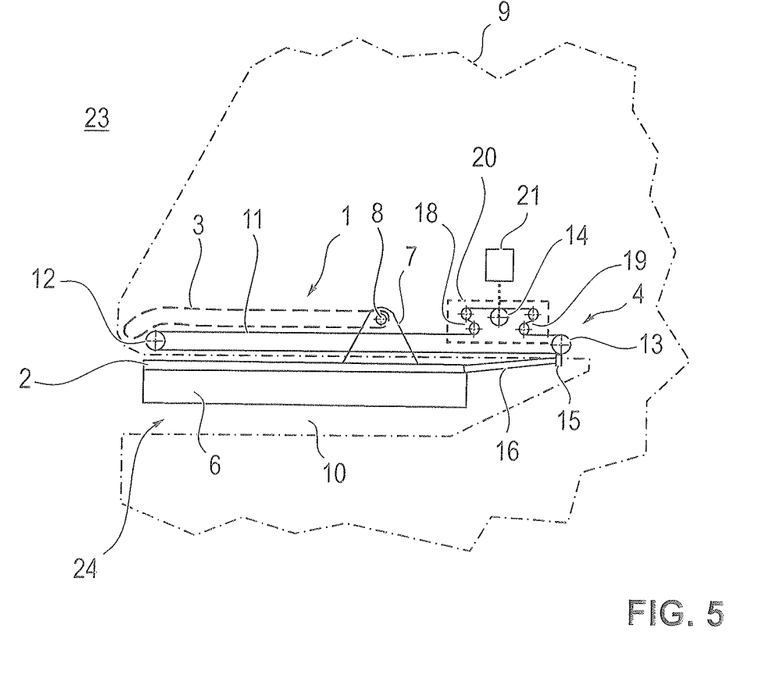

To run the screen carrier 2 and the screen 6 affixed thereto from the open position 22 into a parked position 24 represented in FIG. 5, the winding reel 14 is driven counter-clockwise (in the drawing) by the motor 21, so that the driver 15 is moved towards the main return element 13. As can be seen from the sequence in FIGS. 2 to 5, the screen carrier 2 is thereby first swiveled via a vertical orientation (FIG. 2) into a substantially horizontal orientation (FIG. 4) and in this approximately horizontal orientation is then retracted into the mount 10 along the guide path 3.

FIG. 5 shows the screen carrier 2 with the screen 6 affixed thereto in the parked position 24, in which the screen carrier 2 with the screen 6 is fully accommodated in the mount 10, and is therefore hidden from the vehicle passenger compartment 23. In the parked position 24 the catch 8 of the guide the guide contour 7 is located approximately against the rear stop of the guide path 3, whilst the driver 15 strikes approximately against the rear main return element 13.

The aperture of the mount 10 is optionally closed off from the vehicle passenger compartment 23 by a flap (not shown here). Alternatively the screen 6 and/or the screen carrier 2 may also be designed in such a way that they seal off the mount 10 flush with the aperture.

In the opening adjusting movement of the screen carrier 2 from the parked position 24 into the open position 22 the positions of the device 1 represented in FIG. 1 to FIG. 5 are run through in reverse order.

Inside each cable tensioning unit 18 and 19 the control cable 11 is guided over a fixed return element and a deflectable return element 26, the control cable 11 being deflected by approximately 180° on each of these return elements 25, 26. The deflectable return elements 26 are displaceable in a horizontal direction, that is to say therefore approximately parallel to the main extent of the control cable 11, against an elastic return force, and consequently give rise to a balancing adjustment of the effective control cable lengths. This balancing length adjustment makes it possible, in particular, to brace peak forces when starting the opening and closing adjusting movement of the screen carrier 2. Here, when opening the screen carrier 2, the cable tensioning unit 18 is interposed between the driver 15 and the winding reel 14 in the tensile direction of the control cable 11 and therefore actively helps to compensate for peak loads in the opening of the screen carrier 2. When closing the screen carrier 2, on the other hand, the cable tensioning unit 19 is interposed between the driver 15 and the winding reel 14 in the tensile direction of the control cable 11 and thereby compensates for peak loads occurring during closing of the screen carrier 2. The cable tensioning units 18 and 19 in addition serve to compensate for differences in the cable lengths due to temperature fluctuations, ageing of the control cable, a variation of the winding reel diameter etc. In addition the cable tensioning units 18 and 19 in general allow a precise adjustment of the cable tension, so that under-tensioning or over-tensioning of the control cable 11, and in particular a cable slip resulting from this and excessive cable wear, are avoided.

One embodiment of the pre-assembled unit 20 is shown in actual detail in FIGS. 6 to 11. As can be seen from FIGS. 6 and 7 in particular, the pre-assembled unit 20 here comprises a bearing block 30 for supporting the winding reel 14 (also represented in FIG. 7). Each of the cable tensioning units 18 and 19 comprises a housing 31, which in each case is formed from a housing shell 32 and a housing cover 33, which can be fitted onto this. Here the housing shells 32 of each of the cable tensioning units 18 and 19 are integrally connected to the bearing block 30. In particular, the bearing block 30 is produced together with the housing shells 32 of the cable tensioning units 18, 19 as an integral plastic injection molded component.

Figure 6:
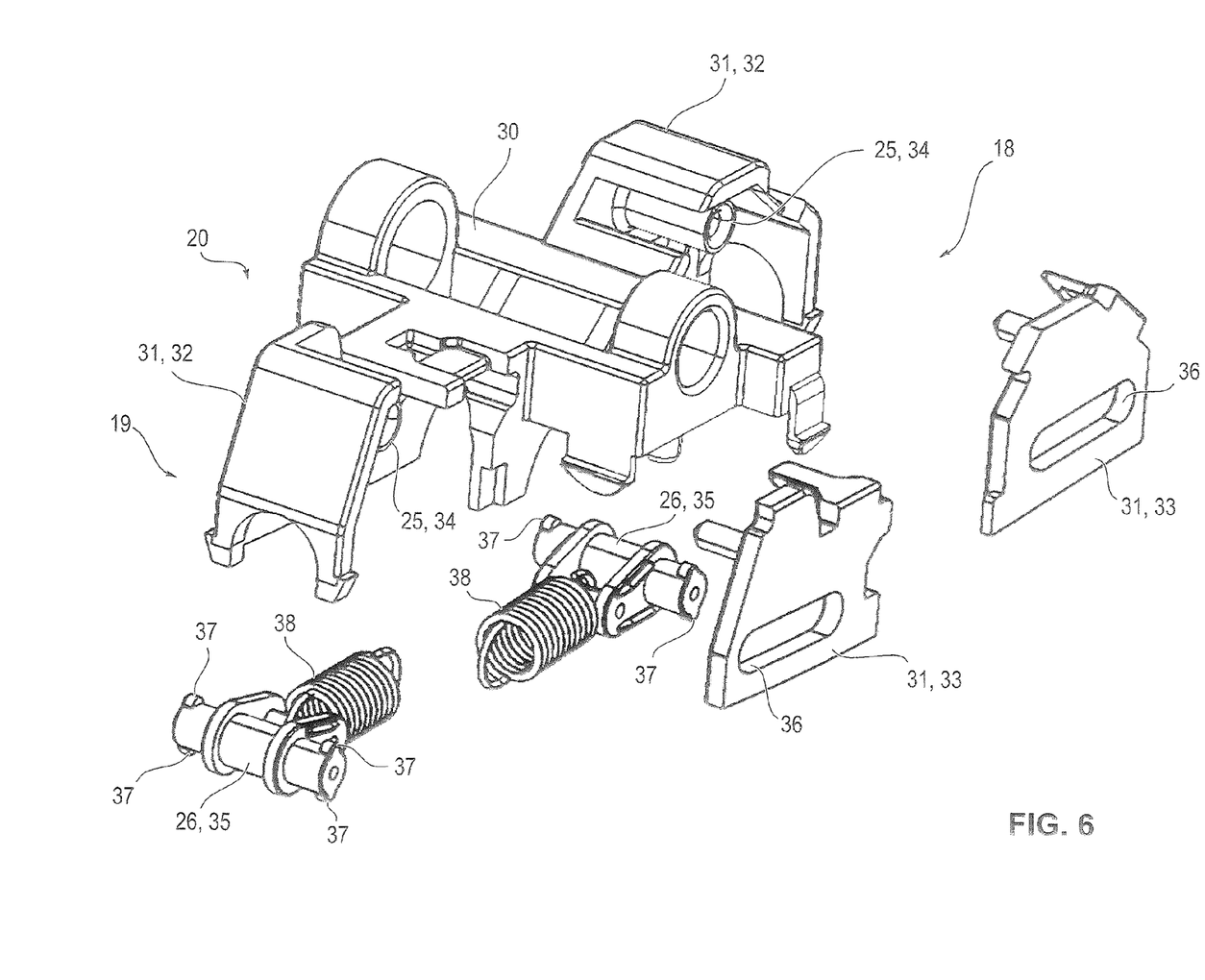
FIG. 6 shows an exploded diagram of a bearing block for a winding reel of the control cable drive with two cable tensioning units formed on to it.
Figure 7:
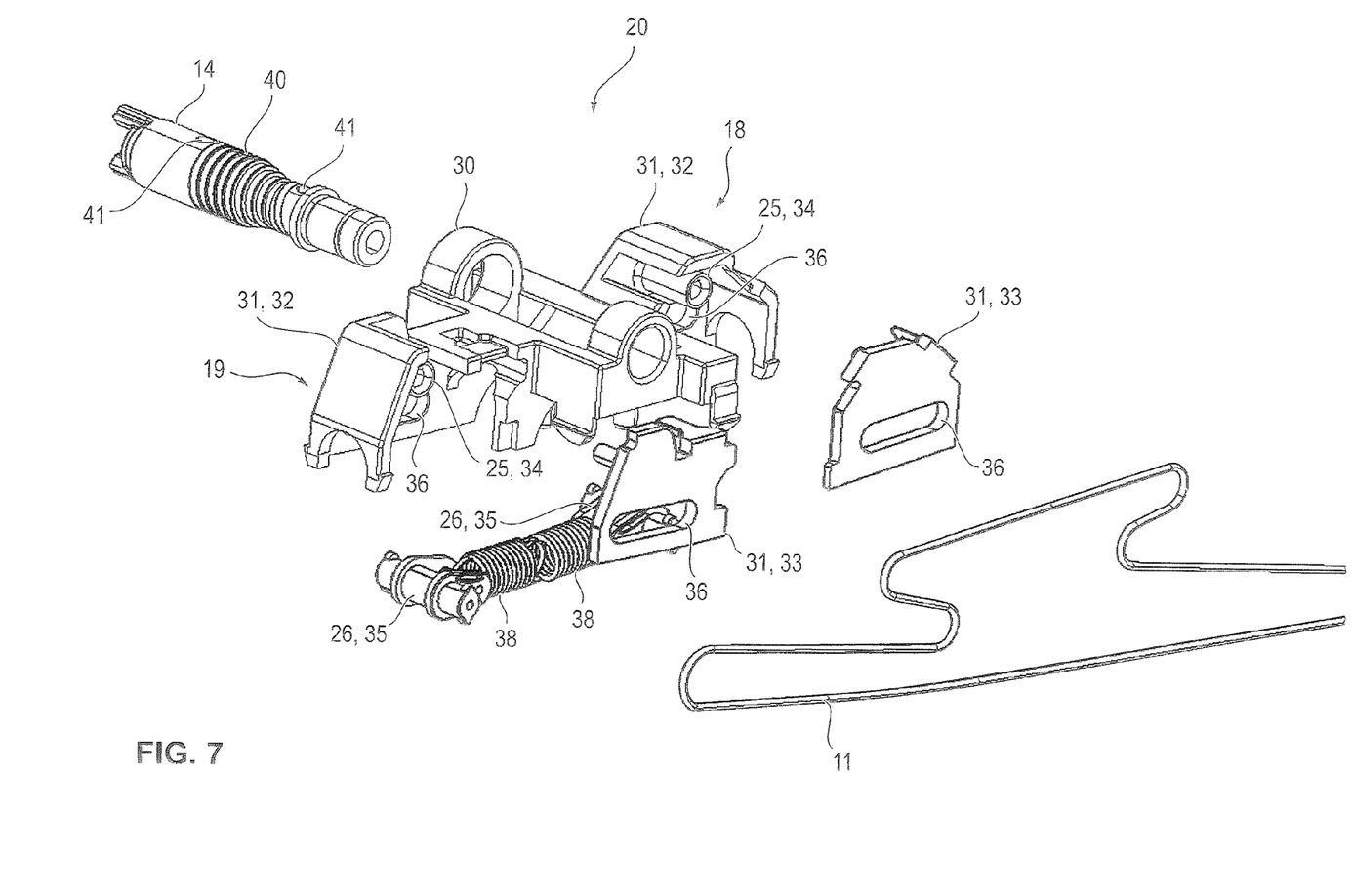
FIG. 7 shows a further exploded diagram of the bearing block and the cable tensioning units and in addition the winding reel and a control cable of the control cable drive.

The fixed return element 25 of each cable tensioning unit 18 and 19 is formed by a spindle 34, which is integrally molded on to the respective housing shell 32 and is therefore both fixed and rotationally fixed. The deflectable return element 26 of each cable tensioning unit 18, 19 is likewise formed by a spindle 35, which in the assembled state is rotationally fixed but which in the housing 31 of the respective cable tensioning unit 18 and 19 is guided in a slotted hole guide 36 provided there, so that it is linearly displaceable transversely to its axial extent.

In each of the two cable tensioning units 18 and 19 the slotted hole guide 36 is formed by two slotted holes arranged so that they align with one another, one of which is made in the respective housing cover 33, and the other in the side wall of the housing shell 32 opposite this.

In each case the spindle 35 of the respective cable tensioning unit 18, 19 is held in the associated slotted hole guide 36 in the manner of a bayonet lock. For this purpose the spindle 35 at each of its axial ends has two radial projections 37 protruding diametrically from the spindle circumference. By means of these radial projections 37 the spindle 35, in the assembled state shown in particular in FIGS. 8 and 9, grips behind the slotted hole guide 36. As a result the spindle 35 is held positively and therefore captively in the slotted hole guide 36. The radial projections 37 furthermore reliably serve to prevent any tilting of the spindle 35 due to an inclined position in the slotted hole guide 36. On the other hand each spindle 35 in a position rotated through 90° in relation to the assembled position, can be easily inserted into the slotted hole guide 36 or removed therefrom without the use of any tools.

The two spindles 35 are each biased towards the bearing block 30 by an associated helical tension spring 38. Here the helical tension springs 38 are supported against a central projection 39 (FIG. 9) of the bearing block 30. In the non-loaded state the spindles 35 of the cable tensioning units 18 and 19 are thereby held against the respective inner stop of the slotted hole guide 36, that is to say the one facing the bearing block 30. In its rest position the return element 26 is thereby held at the furthest possible distance from the fixed return element 25. Instead of helical tension springs other types of spring elements, in particular helical compression springs, leaf springs or formed-on integral spring elements, may also be provided.

Figure 8:
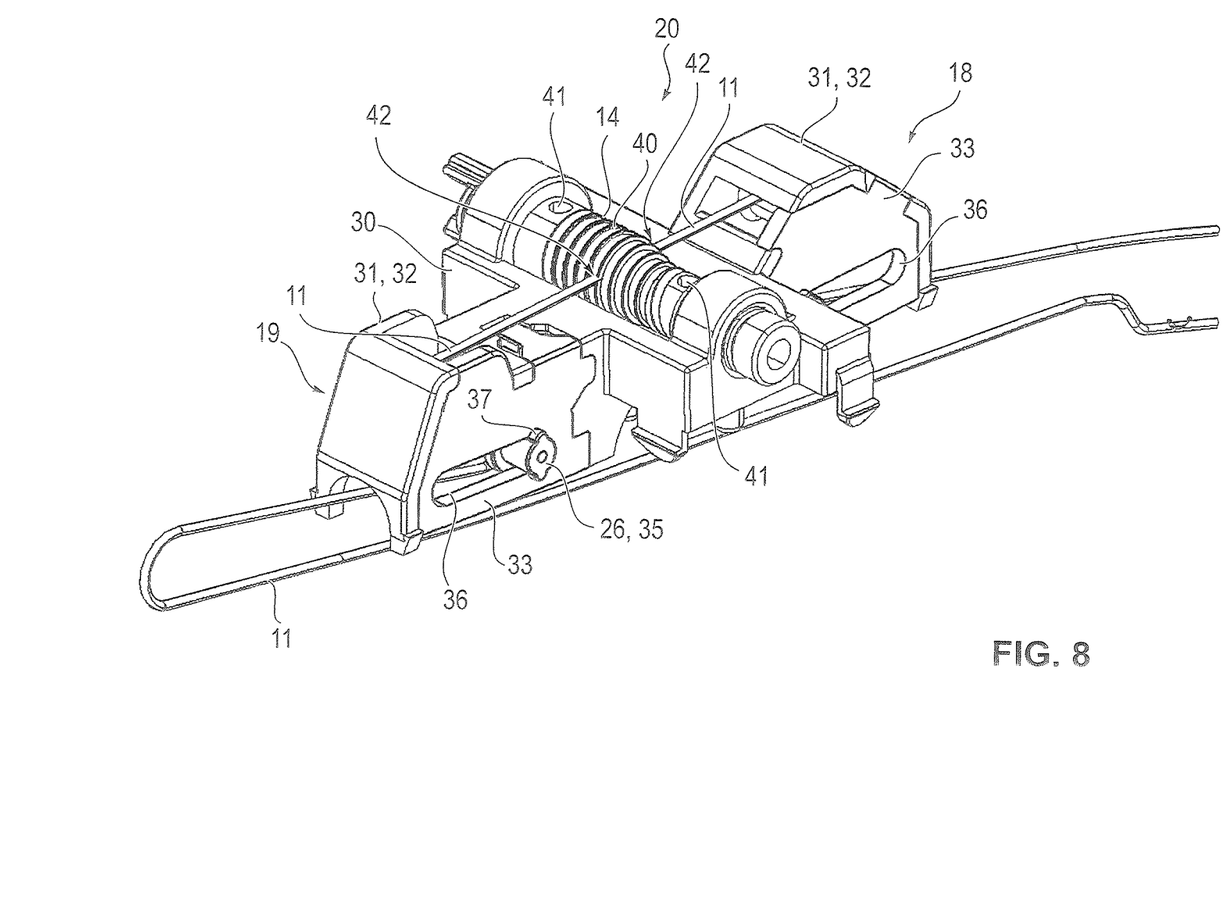
FIG. 8 shows an oblique perspective view from above of the bearing block, the winding reel, the cable tensioning units and the control cable in a pre-assembled state.
Figure 9:
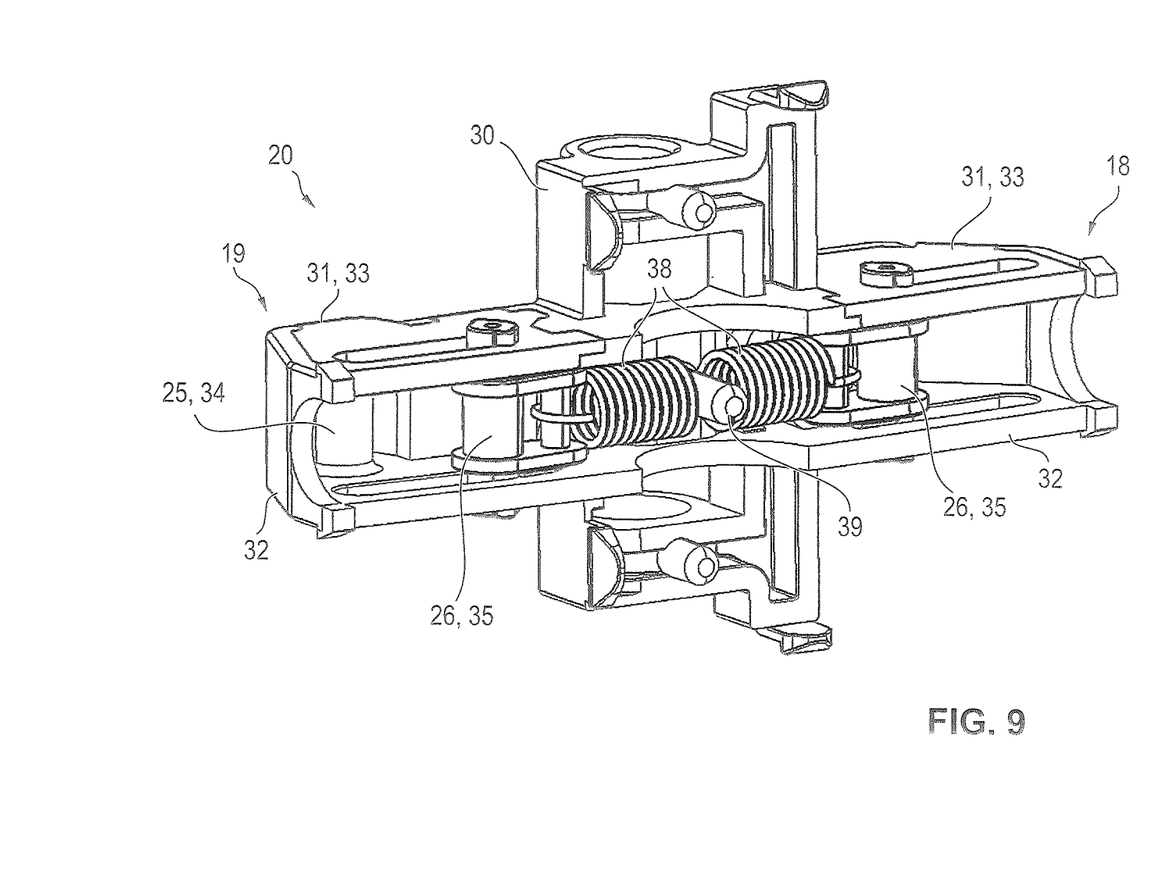
FIG. 9 shows a perspective view from below of the bearing block and the cable tensioning units in a pre-assembled state.

As can be seen from FIGS. 7 and 8 in particular, the winding reel 14 has a thread 40 cut into it (FIG. 7), into which the control cable 11 is laid. Where an open control cable 11 is used, the two physical ends of this control cable 11 are correctly anchored in two bores 41, which are introduced axially into the winding reel 14 on both sides of the thread 40. For improved anchorage of the control cable 11, angled nipples, which engage positively, and in particular latch, in the bores 41, are optionally fitted at the ends thereof. Where a plastic cable is used as control cable 11, the nipples are in particular integrally molded on. Instead of an open control cable 11, however, it is also possible to use an annularly closed control cable 11, as shown in FIG. 7. This is then looped repeatedly around the winding reel 40.

As can be seen from FIGS. 7 and 8 in particular, in the area of the thread 40 the diameter of the winding reel 14 diminishes towards its front end (as shown). The cable separation 42 (FIG. 8) of the control cable 11 is correctly situated in this area with a reduced winding reel diameter when the screen carrier 2 is in or close to the open position 22. The reduced winding reel diameter in this area affords a higher transmission ratio of the control cable drive 4, that is to say a reduced control cable speed at a constant speed of the winding reel 14.

Figure 10:
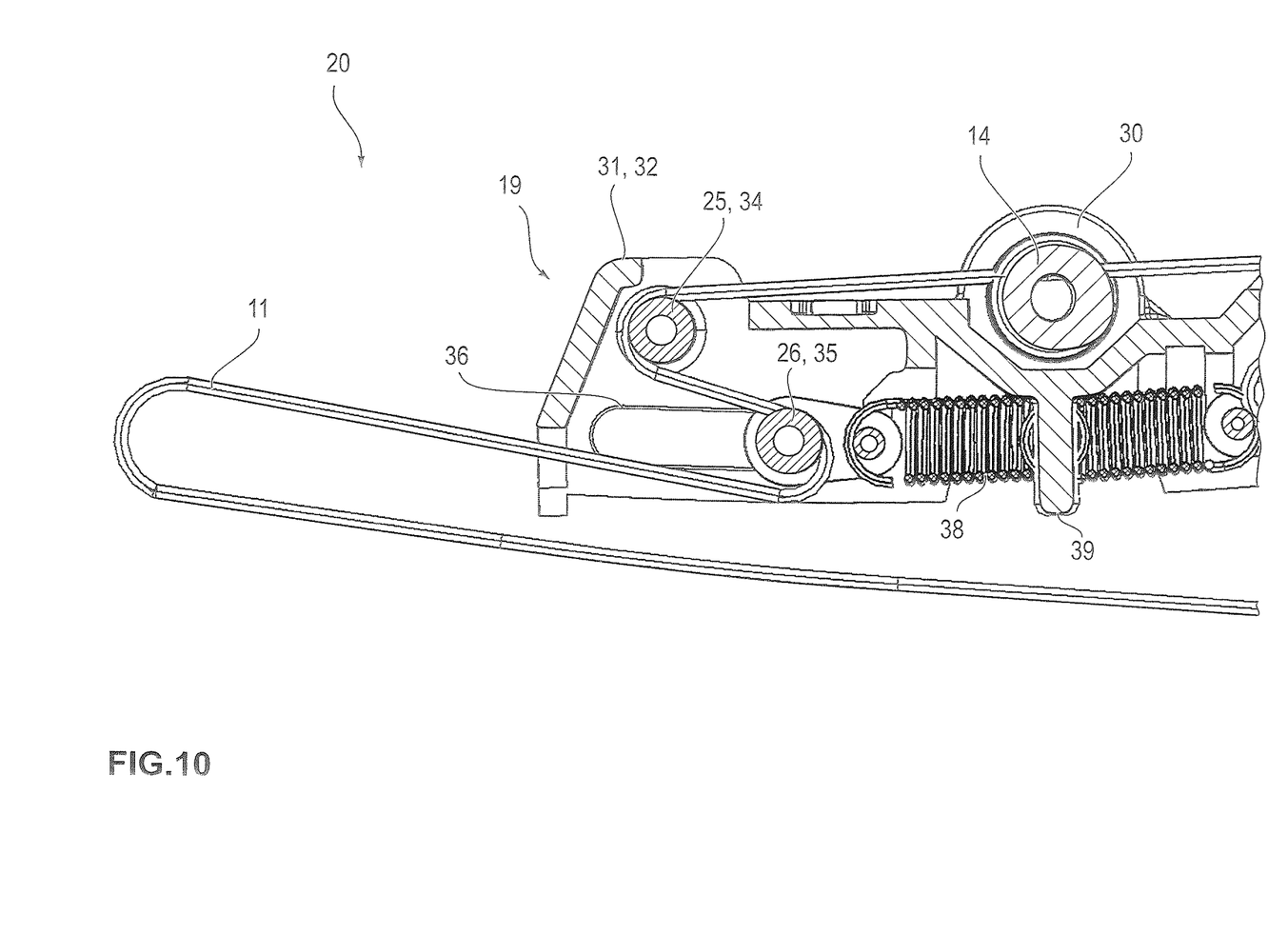
FIG. 10 shows a longitudinal section through the bearing block and one of the cable tensioning units with pre-assembled winding reel and pre-assembled control cable.
Figure 11:
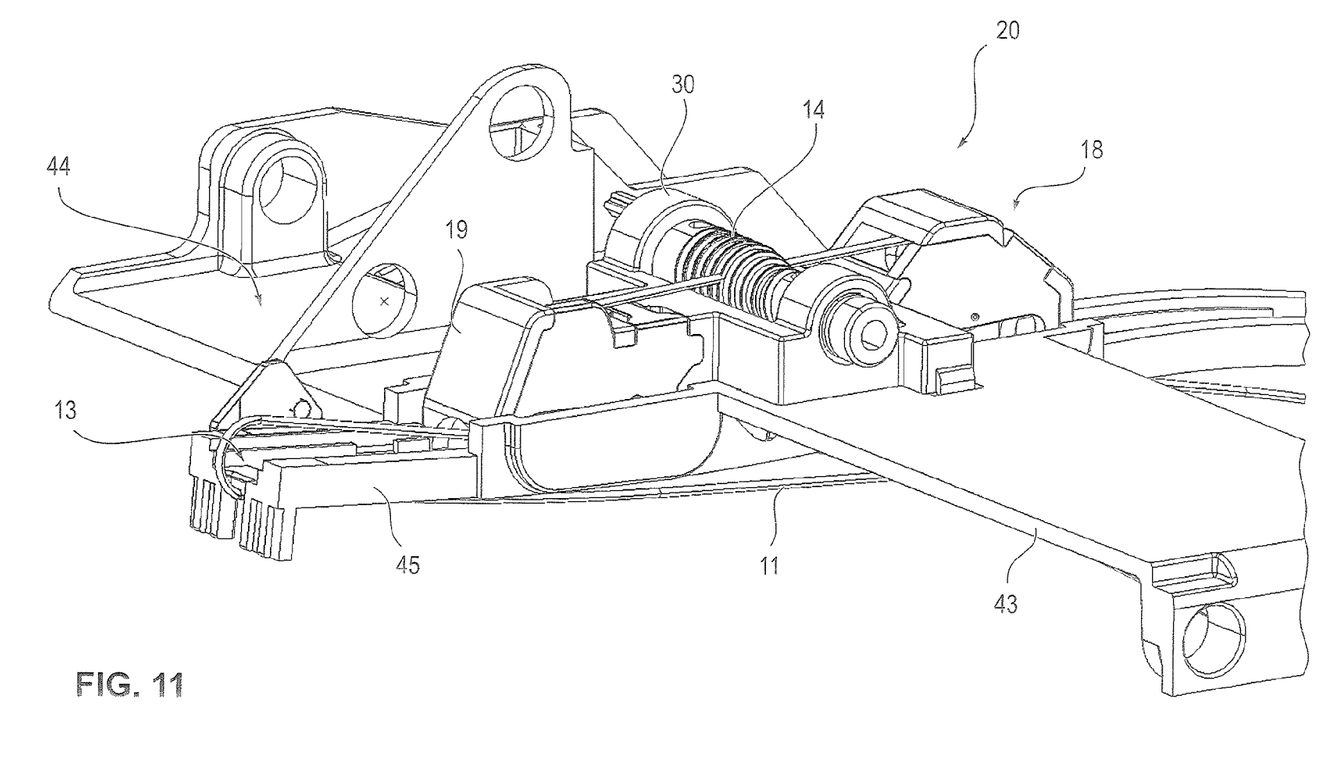
FIG. 11 shows a perspective view of the bearing block, the cable tensioning units, the winding reel and the control cable pre-assembled on a motor cross member.

Leaving the winding reel 14, the control cable 11 is guided over the return elements 25 and 26 of the cable tensioning units 18, 19 in the manner shown in FIG. 10.

The pre-assembled unit 20 can be pre-assembled in the manner shown in FIG. 8 regardless of other components of the screen adjustment device 1 or of the motor vehicle, into which the device 1 is to be fitted. In particular, it is also possible to insert the control cable 11 into the pre-assembled unit 20 even whilst it is still outside the vehicle. In this state the pre-assembled unit 20 is then correctly latched on to a motor cross member 43 shown in FIG. 11, which in its rear area (as shown) comprises a mount 44 for mounting of the drive motor 21 (not shown here). Here a track 45, along which the control cable 11 with the driver 15 (not visible here) is guided, is integrally formed with the motor cross member 43. The location of the other main return element 13 (but not the actual element) is especially indicated in FIG. 11. The sub-assembly formed from the pre-assembled unit 20, the motor cross member 43 with the track 45 and in addition the drive motor 21 and the return elements 12, 13 together with the driver 15, pre-assembled in the manner shown in FIG. 11, can be fitted in its entirety into a motor vehicle.

The invention claimed is:

1. A screen adjustment device for a motor vehicle, the screen adjustment device comprising:
    a screen or screen carrier for mounting such a screen, and
    a control cable drive for adjusting the screen or screen carrier between an open position, in which the screen is accessible from a vehicle passenger compartment, and a parked position, in which the screen is hidden from the vehicle passenger compartment, wherein the control cable drive comprises:
        a control cable, which is coupled to the screen or screen carrier by a driver and which at two ends is guided over two return elements and at least one cable tensioning unit on to a winding reel coupled to a drive motor, and
    a bearing block for supporting the winding reel, said bearing block together with the cable tensioning unit forming a self-contained pre-assembled unit or being capable of pre-assembly to form such a unit.

2. The screen adjustment device as claimed in claim 1, wherein a housing of the cable tensioning unit is produced, at least in part, integrally with the bearing block.

3. The screen adjustment device as claimed in claim 1, wherein the cable tensioning unit comprises, for the control cable:
    a fixed return element, and
    a deflectable return element, which is pre-tensioned and elastically deflectable in relation to the fixed return element.

4. The screen adjustment device as claimed in claim 3, wherein the fixed return element is integrally formed with the bearing block.

5. The screen adjustment device as claimed in claim 3, wherein the deflectable return element is guided linearly or curvilinearly in relation to a housing of the cable tensioning unit.

6. The screen adjustment device as claimed in claim 5, wherein the deflectable return element comprises a spindle, which is displaceably guided in a slotted hole guide of the housing, wherein the spindle in an assembled state grips positively behind the slotted hole guide with at least one radial projection, which is attached in such a way that the spindle, when in a state rotated in relation to the assembled state, can be fed through the slotted hole guide.

7. The screen adjustment device as claimed in claim 5, wherein the deflectable return element is guided in relation to the fixed return element by means of a rail guide or on a lever arm.

8. The screen adjustment device as claimed in claim 1, wherein the cable tensioning unit comprises:
    a housing shell integrally formed on the bearing block, and a housing cover, which can be fitted or latched on to said shell and which is arranged approximately perpendicularly to a spindle of the return elements of the cable tensioning unit.

9. The screen adjustment device as claimed in claim 1, wherein the control cable at each of the two ends is guided over a different one of two cable tensioning units on to the winding reel, and both cable tensioning units are or can be pre-assembled with the bearing block.

10. The screen adjustment device as claimed in claim 1, wherein the bearing block together with the at least one cable tensioning unit pre-assembled thereon is latchable on to a motor carrier for mounting of the motor.

11. The screen adjustment device as claimed in claim 1, wherein the winding reel has a diameter varying over its axial extent in order to achieve a variable control cable speed at a constant motor speed.

12. The screen adjustment device as claimed in claim 11, wherein the winding reel is in an axial area which, according to a respective cable separation of the control cable from the periphery of the winding reel, corresponds to a range of screen adjustment travel close to the open position, has a smaller diameter than in an axial area which, according to the cable separation, corresponds to a middle position of the screen along its displacement travel between the open position and the parked position.

* * * * *